(12) United States Patent
Denk et al.

(10) Patent No.: US 7,890,845 B2
(45) Date of Patent: Feb. 15, 2011

(54) INTEGRATED MPE-FEC RAM FOR DVB-H RECEIVERS

(75) Inventors: Tracy Denk, Aliso Viejo, CA (US); Chaoliang T. Chen, Irvine, CA (US); Philip Treigherman, Newport Beach, CA (US); Nabil R. Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 993 days.

(21) Appl. No.: 11/692,296

(22) Filed: Mar. 28, 2007

(65) Prior Publication Data

US 2008/0244246 A1 Oct. 2, 2008

(51) Int. Cl.
*H03M 13/00* (2006.01)
(52) U.S. Cl. .................................. 714/784; 714/756
(58) Field of Classification Search .................. 714/752, 714/756, 784
See application file for complete search history.

(56) References Cited

U.S. PATENT DOCUMENTS

| | | | |
|---|---|---|---|
| 7,447,980 B2 * | 11/2008 | Xu et al. ..................... 714/776 |
| 7,454,683 B2 * | 11/2008 | Vesma et al. ................. 714/752 |
| 7,496,821 B2 * | 2/2009 | Stare ........................... 714/751 |
| 7,584,495 B2 * | 9/2009 | Hannuksela et al. ........ 725/101 |
| 7,610,544 B2 * | 10/2009 | Guo ............................. 714/776 |
| 7,644,343 B2 * | 1/2010 | Gubbi et al. ................. 714/776 |
| 7,653,415 B2 * | 1/2010 | van Rooyen ............. 455/562.1 |

* cited by examiner

*Primary Examiner*—Esaw T Abraham
(74) *Attorney, Agent, or Firm*—Rahman LLC

(57) ABSTRACT

A MPE-FEC memory chip and method for use in a DVB-H receiver, wherein the memory chip comprises a TS demux; a RS decoder; a system bus; and a RAM unit adapted to simultaneously interface to the TS demux, the RS decoder, and the system bus through time-multiplexing, wherein the RAM unit is adapted to (i) access multiple-words per clock cycle, and (ii) cache write and read accesses to reduce memory access from the TS demux and the system bus, and wherein the RAM unit is adapted to be clocked at a speed higher than an interfacing data-path to increase an effective throughput of the RAM unit. The RAM unit may comprise multiple RAM sub units, wherein while a first RAM sub unit is clock gated, the remaining multiple RAM sub units are accessible.

20 Claims, 4 Drawing Sheets

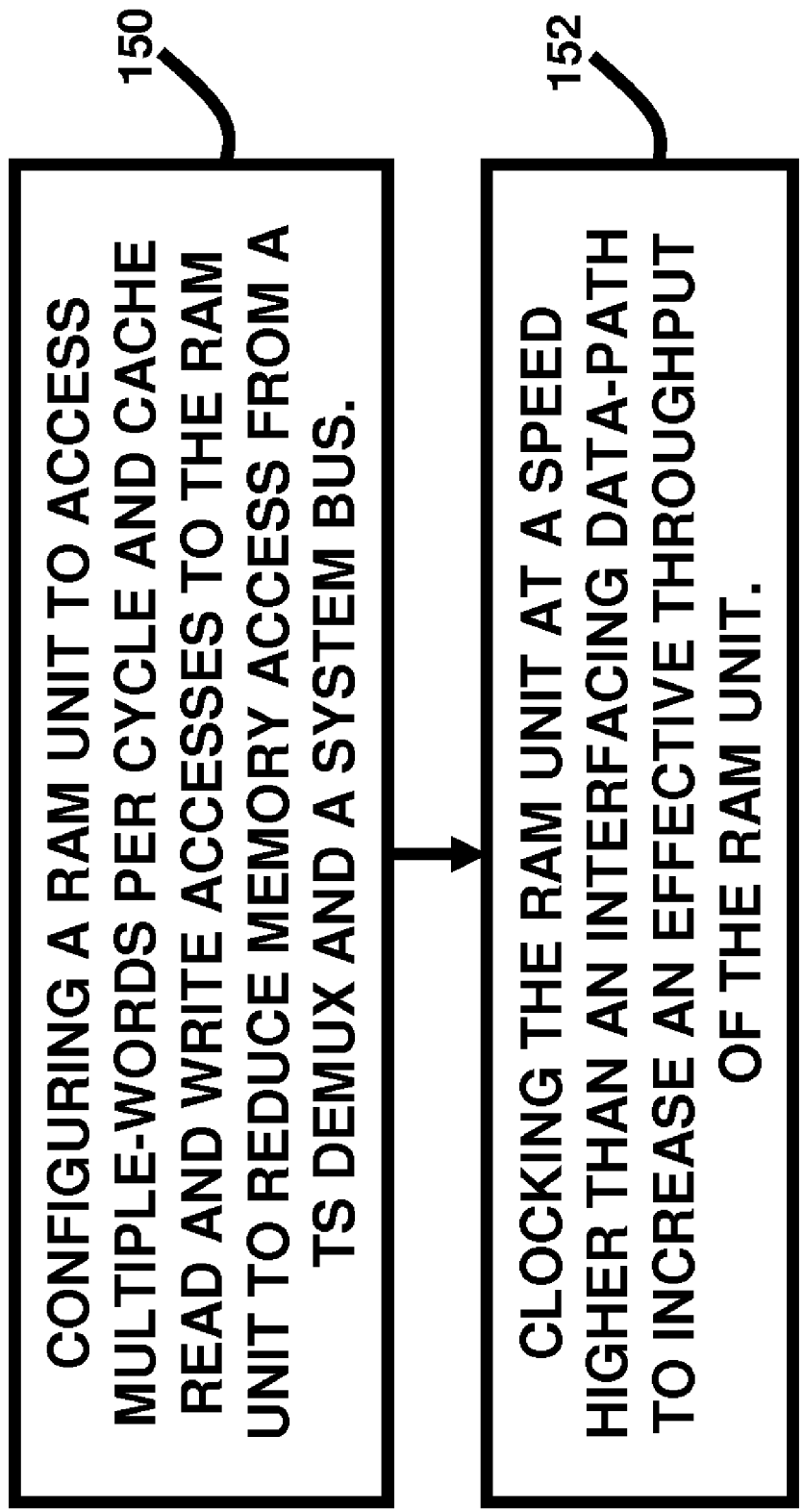

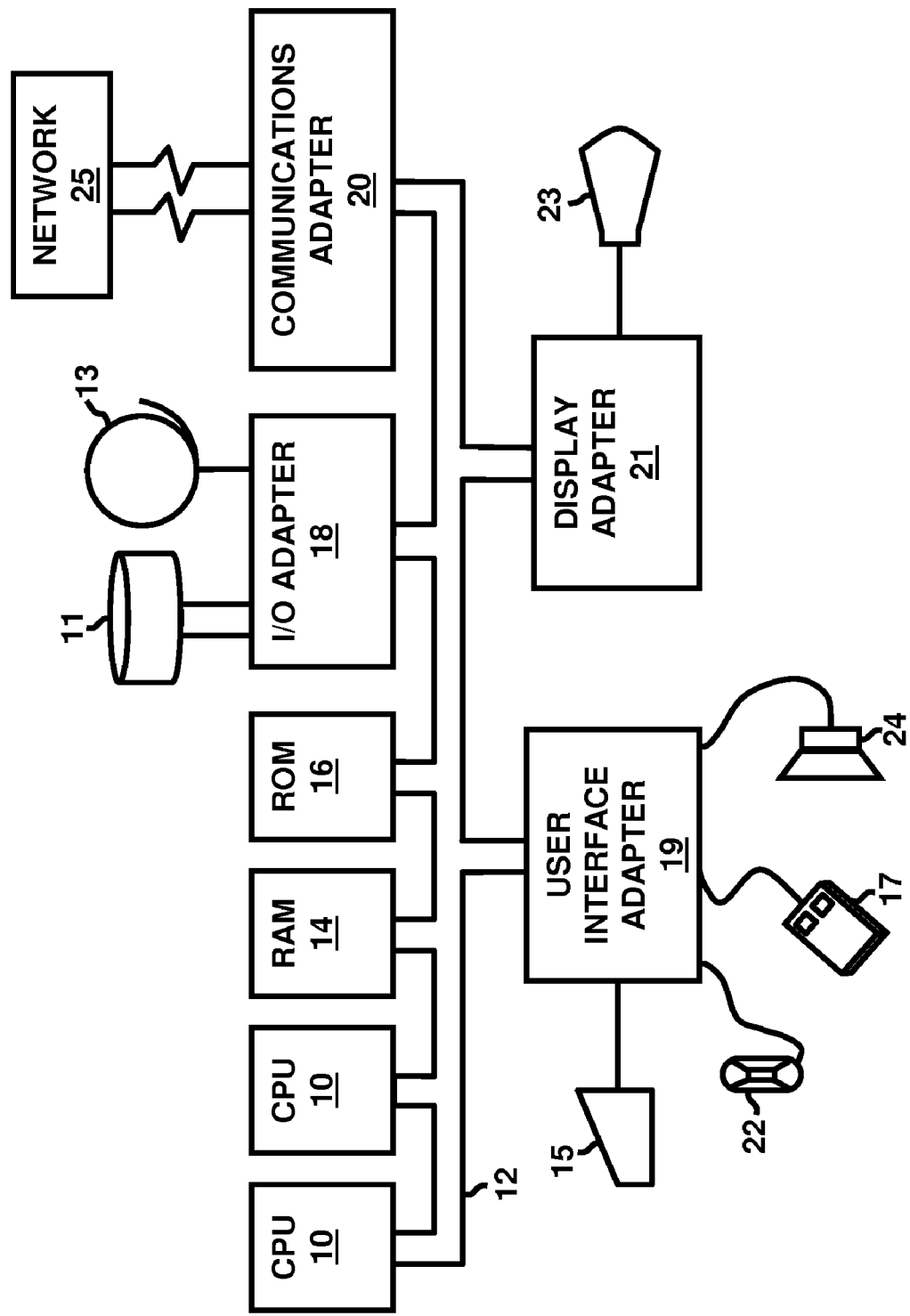

INTEGRATED MPE-FEC RAM FOR DVB-H RECEIVERS

BACKGROUND

1. Technical Field

The embodiments herein generally relate to wireless technologies, and, more particularly, to Digital Video Broadcasting over Handled (DVB-H) technologies.

2. Description of the Related Art

A DVB-H device transmitter uses a Reed-Solomon (RS) encoder along with an interleaver to provide protection from burst errors caused by impairments in the communication channel. In DVB-H receivers, a RS decoder and deinterleaver are generally required to recover the transmitted data. This deinterleaver requires storage of an entire "frame" of data, and typically the most efficient way to implement this is data storage with a Random Access Memory (RAM) which is referred to as the Multi-Protocol Encapsulator Forward Error Correction (MPE-FEC) RAM. However, due to the large amount of data in the MPE-FEC RAM, the implementation of this RAM has a significant impact on the silicon area and power consumption of the DVB-H receiver.

The function of the MPE-FEC RAM is as follows:

1. Internet Protocol (IP) datagrams are written into the RAM column-by-column by the Transport-stream packet de-multiplexer (TS demux).
2. IP datagrams are read from the RAM row-by-row for input to the RS decoder.
3. The RS decoder output is written to the RAM row-by-row.
4. The corrected IP datagrams are read from the RAM column-by-column for post-processing and output.

Accordingly, it can been seen there are multiple interfaces that require access to the RAM simultaneously; however, the RAM can only have a single access port because additional ports would make the RAM prohibitively large. The first challenge is to find an architecture which uses a single-port MPE-FEC RAM.

The second challenge is to implement this RAM with low power consumption. The sheer size of the RAM (a minimum of 255 k bytes of storage is required for one DVB-H frame) leads to a large RAM which consumes significant power.

The third challenge is to find an addressing scheme for this RAM which can handle the reception of multiple back-to-back frames of data; i.e., the RAM has to store the second frame without overwriting the previous frame.

Conventionally, the DVB-H receiver MPE-FEC memory is implemented off-chip. Compared to an on-chip RAM, the off-chip RAM generally requires: 1) more power consumption due to switching of signals on the circuit board between the DVB-H demodulator chip and the MPE-FEC RAM chip; 2) more circuit board area because the overall solution requires two chips rather than one; and 3) more overall processing cost because of additional silicon, packaging, and testing costs for the separate memory chip. Therefore, there remains a need for a new MPE-FEC RAM for DVB-H receivers.

SUMMARY

In view of the foregoing, an embodiment provides a MPE-FEC memory chip for use in a DVB-H receiver, wherein the memory chip comprises a TS demux; a RS decoder; a system bus; and a RAM unit adapted to simultaneously interface to the TS demux, the RS decoder, and the system bus through time-multiplexing, wherein the RAM unit is adapted to (i) access multiple-words per clock cycle, and (ii) cache write and read accesses to reduce memory access from the TS demux and the system bus, and wherein the RAM unit is adapted to be clocked at a speed higher than an interfacing data-path to increase an effective throughput of the RAM unit. The RAM unit may comprise multiple RAM sub units, wherein while a first RAM sub unit is clock gated, the remaining multiple RAM sub units are accessible. Moreover, the memory chip may further comprise a register cache that is external to the RAM unit, wherein the register cache is adapted to decrease a frequency of read and write processes occurring with respect to the RAM unit.

Preferably, the RAM unit is a single port RAM unit that is adapted to be clocked at approximately twice a system clock rate, wherein a first virtual port of the single port RAM unit is preferably shared by a RS decoder read and write access, and wherein a second virtual port of the single port RAM unit is preferably shared by a post-processing system output read, control logic access, and a TS demux write access. In this regard, the "virtual port" refers to a piece of time rather than a piece of physical RAM space. Furthermore, an amount of memory of the RAM unit may be adapted to be extended by a fractional amount of a complete video frame, wherein the amount of extended fractional-frame memory may be adapted to store a beginning portion of a second incoming video frame during which the RS decoder can complete a FEC process on a first video frame. Preferably, a remaining portion of the second incoming video frame overwrites a region wherein the first video frame was stored after the first video frame begins to be read out. Additionally, the memory chip may further comprise a demodulator positioned on a same silicon chip as the RAM unit, the TS demux the RS decoder, and the system bus.

Another embodiment provides a MPE-FEC memory chip for use in a DVB-H receiver, wherein the memory chip comprises a TS demux; a RS decoder; a system bus; a RAM unit adapted to simultaneously interface to the TS demux, the RS decoder, and the system bus through time-multiplexing; and a demodulator positioned on a same silicon chip as the RAM unit, the TS demux the RS decoder, and the system bus, wherein the RAM unit is adapted to (i) access multiple-words per clock cycle, and (ii) cache write and read accesses to reduce memory access from the TS demux and the system bus, and wherein the RAM unit is adapted to be clocked at a speed higher than an interfacing data-path to increase an effective throughput of the RAM unit.

Another embodiment provides a method of processing video IP datagrams in a DVB-H receiver, wherein the DVB-H receiver comprises a MPE-FEC memory chip comprising a TS demux; a RS decoder; a system bus; and a RAM unit adapted to simultaneously interface to the TS demux, the RS decoder, and the system bus through time-multiplexing, wherein the method comprises configuring the RAM unit to access multiple-words per cycle and cache read and write accesses to the RAM unit to reduce memory access from the TS demux and the system bus; and clocking the RAM unit at a speed higher than an interfacing data-path to increase an effective throughput of the RAM unit.

The method may further comprise splitting the RAM unit into multiple smaller RAM subunits. Moreover, the method may further comprise using a register cache that is external to the RAM unit to decrease a frequency of read and write processes occurring with respect to the RAM unit. Also, the method may further comprise clocking the RAM unit at approximately twice a system clock rate. Preferably, an amount of memory of the RAM unit is adapted to be extended by a fractional amount of a complete video frame, wherein the amount of extended fractional-frame memory is preferably adapted to store a beginning portion of a second incoming video frame during which the RS decoder can complete a FEC process on a first video frame, and wherein a remaining portion of the second incoming video frame preferably overwrites a region wherein the first video frame was stored after the first video frame begins to be read out. Additionally, the method may further comprise positioning a demodulator on a same silicon chip as the RAM unit, the TS demux the RS decoder, and the system bus. Moreover, the method may further comprise using a circular addressing scheme to allow the chip to receive back-to-back data bursts without doubling a size of the RAM unit.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3 is a flow diagram illustrating a preferred method according to an embodiment herein; and FIG. 4 illustrates a schematic diagram for a computer system according to an embodiment herein.

DETAILED DESCRIPTION OF PREFERRED EMBODIMENTS

Figure 1:
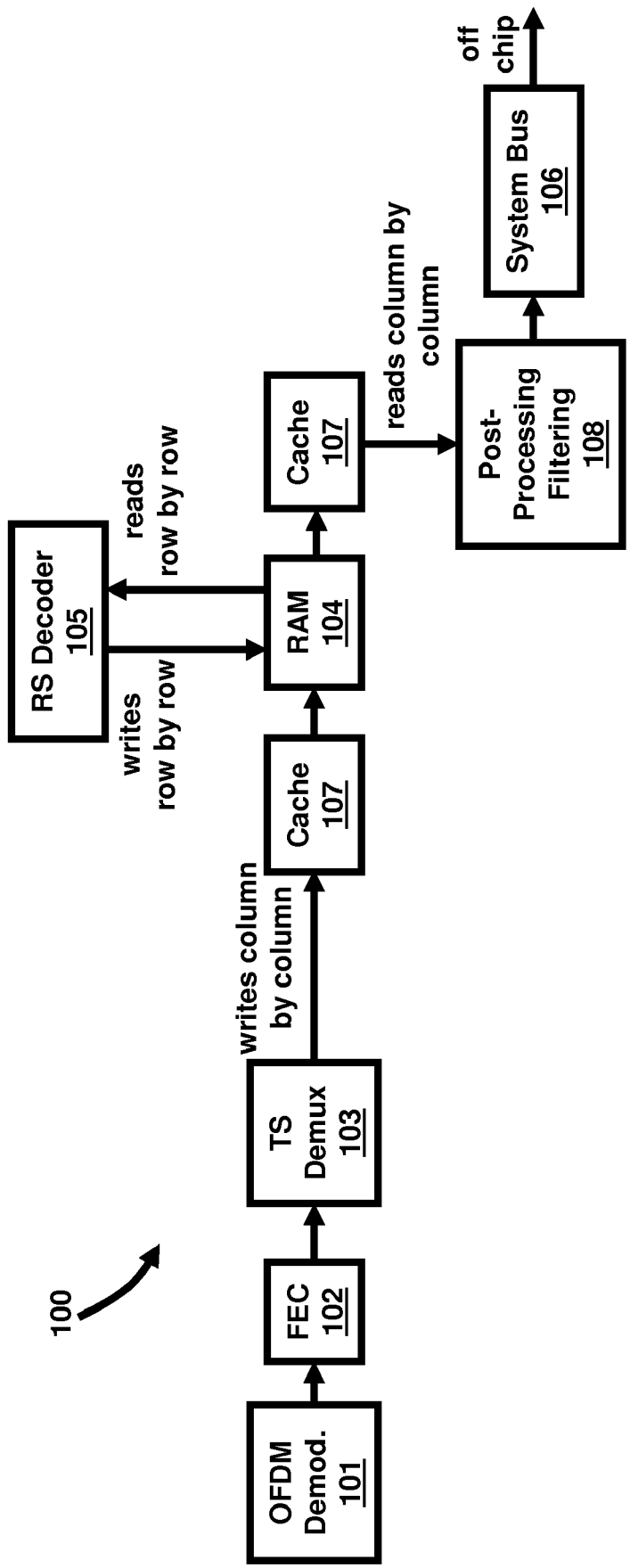
FIG. 1 illustrates a schematic diagram of a system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a new MPE-FEC RAM for DVB-H receivers. The embodiments herein achieve this by providing a MPE-FEC RAM architecture that uses a single-port RAM, reduces the power consumption, and addresses the RAM in a manner which supports back-to-back frames of DVB-H data. Referring now to the drawings, and more particularly to FIGS. 1 through 4, where similar reference characters denote corresponding features consistently throughout the figures, there are shown preferred embodiments.

As shown in FIG. 1, the MPE-FEC memory 100 can use a single-port RAM 104 to simultaneously interface to the TS Demux 103, the RS decoder 105, and the system bus 106 through time-multiplexing. This is made possible by (a) configuring the RAM 104 to access multiple-words per cycle and caching the write and read accesses to reduce the memory access from the TS Demux 103 and the system bus 106; and (b) clocking the RAM 104 at a speed higher than the interfacing data-path to increase the effective throughput of the RAM 104.

An example of caching is when a memory word is 64 bits and the system bus 106 is accessing 32-bit words, which makes it possible to register half of the memory output word (i.e., to cache it) and thus save one memory access per two system bus accesses. As an example for achieving the increased effective throughput, by clocking the memory at twice the clock rate of interfacing datapath, one can perform two memory accesses per one datapath clock cycle, thereby raising the effective throughput of the RAM 104.

In an alternate embodiment the MPE-FEC memory 100 can be split into multiple smaller RAMs 104 to save power. The power savings comes from the fact that one RAM 104 is clock gated while the memory components (103, 105, 106, 108) access the other RAM 104. Furthermore, the MPE-FEC memory 100 can use an external register cache 107 to decrease the read/write frequency and subsequently decrease power consumption. This can be accomplished, for example, by caching sequential input bytes from the TS Demux 103 in a 32 or 64-bit register and then writing the entire cached word to the RAM 104 at a reduced frequency.

Figure 2:
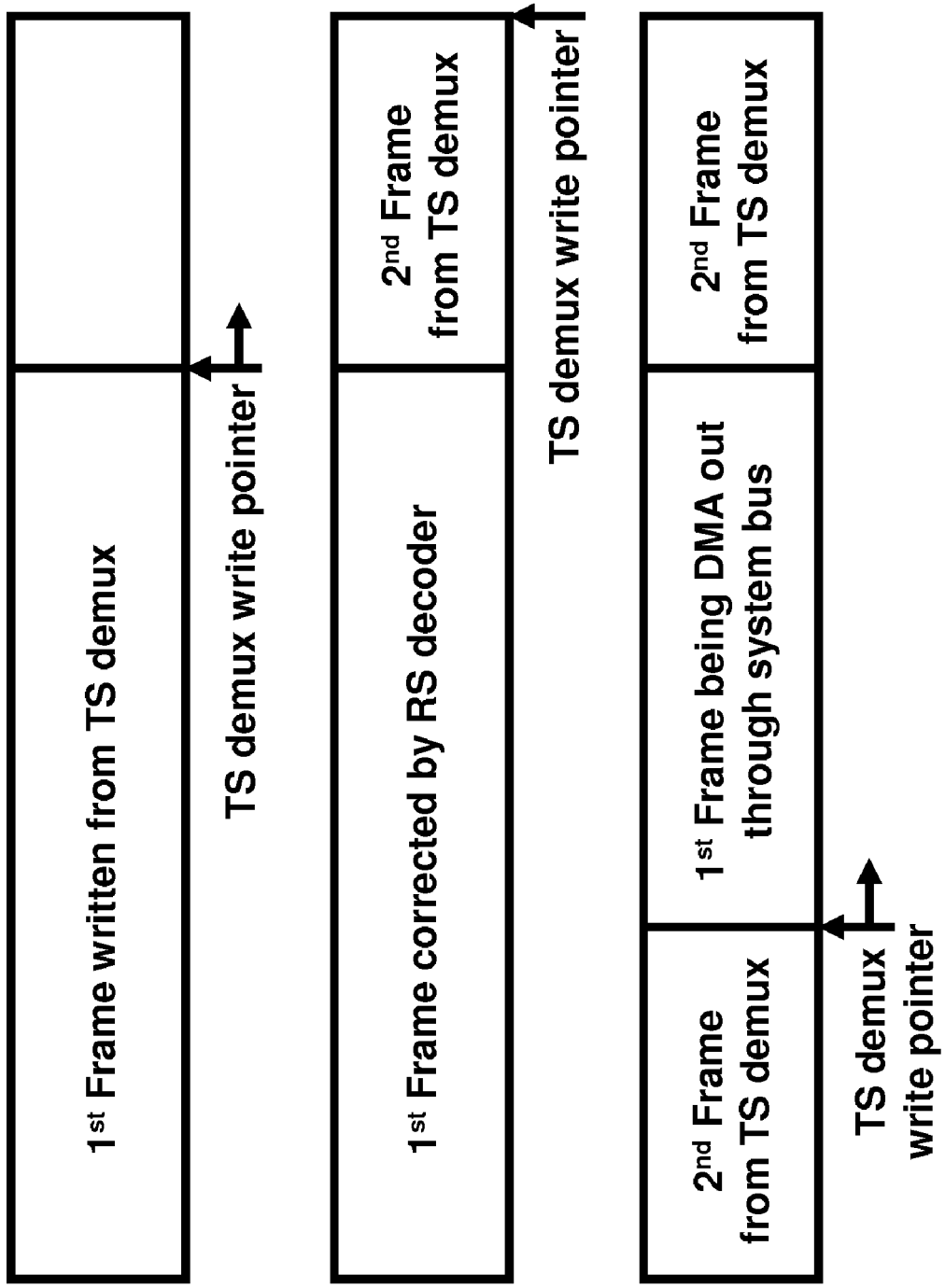
FIG. 2 illustrates a schematic diagram of a circular addressing scheme for multi-frame support according to an embodiment herein.

Moreover, with reference to FIGS. 1 and 2, the MPE-FEC memory 100 can use a circular addressing scheme (shown in FIG. 2) to support a second immediate incoming frame without destroying the data in the first frame. This allows the MPE-FEC memory 100 to process multiple back-to-back DVB-H channels with a small memory size which is slightly larger than one frame, thereby saving the power and area.

FIG. 2 illustrates writing of two consecutive frames into memory in a circular manner. Specifically, FIG. 2 shows how the TS Demux write pointer for the 2nd frame wraps around in memory and the 2nd frame overwrites the beginning of the 1st frame, while the rest of the 1st frame is being streamed out via the system bus 106 (of FIG. 1).

Additionally, by combining the various embodiments herein, the single-port MPE-FEC memory 100 is practically small enough to be implemented on the same silicon die as the DVB-H demodulator 101 rather than on a separate silicon die, greatly improving the area, power, and cost issues associated with conventional external MPE-FEC RAM.

To allow a single-port RAM 104 to serve all interfaces at the same time, the architecture provided by the embodiments herein supports the maximum throughput requirement of the following interfaces:

1. TS demux write—one byte every 8 clock cycles for highest bit-rate.

2. RS decoder read—one byte per clock cycle during input stage of RS decoding and one byte every other clock during correction stage.

3. RS decoder write—one byte every other clock cycle during the correction stage, interleaving with RS decoder read.

4. Post-processing/system output read—maximum of four bytes per clock cycle for a 32-bit system bus direct memory access (DMA).

5. Housekeeping access from control logic—infrequent access, a few bytes per frame.

The RAM 104 is clocked at twice the system clock rate, creating a virtual two-port RAM 104 when the interfacing modules are clocked at nominal system clock rate. The first virtual port is shared by the RS decoder read and write access, which is sufficient for the required maximum throughput of one-byte per system clock at any given time. The second virtual port is shared by the bus/post-processing/system 106, 108 output read, control logic access, and the TS demux write. The MPE-FEC RAM 104 is configured to be an integer multiple of the output system bus width in the MPE column-wise direction, therefore one MPE-FEC RAM read in one system clock cycle is sufficient to feed at least two sequential-addressed system bus read cycles when the output from the MPE-FEC RAM 104 is cached. This frees at least every other system clock cycle on the second virtual port, sufficient to serve the TS demux write and other housekeeping control logic accesses.

The manner of reducing the power consumption of the MPE-FEC RAM 104 is by reducing the memory access frequency and to clock gate the RAM 104 whenever possible. The above-mentioned caching in the post-processing/output read reduces the access by a factor of N, whereas N is the ratio of MPE-FEC RAM width over the post-processing/output bus width. To further reduce the access frequency, the incoming TS demux data stream is buffered up to the length of one MPE-FEC RAM word before a write is committed, thereby reducing the access from TS demux by a factor of M, whereas M is the number of bytes in one MPE-FEC RAM word. Furthermore, the MPE-FEC RAM 104 is split into multiple banks and the clock is gated off whenever a bank is not being accessed to save the power.

To enable a DVB-H receiver (not shown) to receive multiple channels where, in a worst-case scenario, frames from various channels come one right after the other, the circular addressing scheme of FIG. 2 is employed in the MPE-FEC RAM 104 (of FIG. 1) with the total amount of memory extended by a fractional amount of a complete frame. The amount of extended fractional-frame memory is designed to store the beginning part of the second incoming frame, during which the RS decoder 105 can complete the decoding on the first received frame. The remaining portion of the second incoming frame data starts to overwrite the region where first frame was stored after the first frame started to be read out. The use of a circular addressing scheme as shown in FIG. 2 allows one to use memory much smaller than two full frames typically required to service multiple DVB-H channels, which further reduces overall area and power consumption.

FIG. 3, with respect to FIGS. 1 and 2, is a flow diagram illustrating a method of processing video IP datagrams in a DVB-H receiver, wherein the DVB-H receiver comprises a MPE-FEC memory chip 100 comprising a TS demux 103; a RS decoder 105; a system bus 106; and a RAM unit 104 adapted to simultaneously interface to the TS demux 103, the RS decoder 105, and the system bus 106 through time-multiplexing, wherein the method comprises configuring (150) the RAM unit 104 to access multiple-words per cycle and cache read and write accesses to the RAM unit 104 to reduce memory access from the TS demux 103 and the system bus 106; and clocking (152) the RAM unit 104 at a speed higher than an interfacing data-path to increase an effective throughput of the RAM unit 104.

The method may further comprise splitting the RAM unit 104 into multiple smaller RAM subunits. Moreover, the method may further comprise using a register cache 107 that is external to the RAM unit 104 to decrease a frequency of read and write processes occurring with respect to the RAM unit 104. Also, the method may further comprise clocking the RAM unit 104 at approximately twice a system clock rate. Preferably, an amount of memory of the RAM unit 104 is adapted to be extended by a fractional amount of a complete video frame, wherein the amount of extended fractional-frame memory is preferably adapted to store a beginning portion of a second incoming video frame during which the RS decoder 105 can complete a FEC process on a first video frame, and wherein a remaining portion of the second incoming video frame preferably overwrites a region wherein the first video frame was stored after the first video frame begins to be read out. Additionally, the method may further comprise positioning a demodulator 101 on a same silicon chip 100 as the RAM unit 104, the TS demux 103 the RS decoder 105, and the system bus 106. Moreover, the method may further comprise using a circular addressing scheme to allow the chip 100 to receive back-to-back data bursts without doubling a size of the RAM unit 104.

The embodiments herein can include both hardware and software elements. The software embodiments include but are not limited to firmware, resident software, microcode, etc. Furthermore, the embodiments herein can include a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a RAM, a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The techniques provided by the embodiments herein may be implemented on an integrated circuit (IC) chip or using printable electronic technologies (not shown). The chip or printable electronic circuit design is created in a graphical computer programming language, and stored in a computer storage medium (such as a disk, tape, physical hard drive, or virtual hard drive such as in a storage access network). If the designer does not fabricate chips or printable electronic circuits or the photolithographic masks used to fabricate chips or printable electronic circuits, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII or CIF) for the fabrication of photolithographic masks, which typically include multiple copies of the chip design in question that are to be formed on a wafer or printed on a suitable substrate. The photolithographic masks are utilized to define areas of the wafer or printable electronic circuits (and/or the layers thereon) to be etched or otherwise processed or printed.

The resulting integrated circuit chips or printable electronic circuits can be distributed by the fabricator in raw wafer form (that is, as a single wafer that has multiple unpackaged chips), as a bare die, or in a packaged form or as individual printed circuits or in a sheet or roll of printed circuits. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip might then be integrated with other chips, discrete circuit elements, and/or other signal processing devices as part of either (a) an intermediate product, such as a mother or daughter-board, or (b) an end product. The end product can be any product that includes integrated circuit chip or chips and/or printed circuits, ranging from toys and other low-end applications to advanced computer products having a display, a keyboard or other input device, and a central processor.

A representative hardware environment for practicing the embodiments herein is depicted in FIG. 4. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a RAM 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The embodiments herein double the I/O bandwidth by doubling the clock, which allows the use of a single-port RAM 104 to service clients. The embodiments further organize the I/O into multiple "virtual ports", which is allowed by doubling the clock, which allows one to properly organize the RAM clients. The actual RAM 104 is single port and clocking at twice the system clock creates a "virtual dual port RAM". The embodiments herein utilize caches for the data from the TS Demux 103 into the RAM 104 and the system bus 106 data out of the RAM 104 to reduce the memory accesses and thereby saves power. Furthermore, the embodiments herein are able to save chip area by using a single-port RAM 104, and more particularly, are able to save system cost, power, and (chip) board area by using an on-chip RAM 104. Additionally, the embodiments specifically utilize a circular addressing scheme to allow the chip to receive back-to-back bursts without doubling the size of the RAM 104, which saves area by increasing the RAM 104 by a fractional amount rather than doubling it. Moreover, the embodiments herein partition the MPE-FEC 100 into multiple RAM units 104 so one RAM 104 can remain static while the other is being accessed, which further saves power.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A Multi-Protocol Encapsulator Forward Error Connection (MPE-FEC) memory chip for use in a Digital Video Broadcasting over Handheld (DVB-H) receiver, said memory chip comprising:
   a Transport-stream packet de-multiplexer (TS demux);
   a Reed-Solomon (RS) decoder;
   a system bus; and
   a random access memory (RAM) unit that simultaneously interfaces to said TS demux, said RS decoder, and said system bus through time-multiplexing,
   wherein said RAM unit (i) accesses multiple-words per clock cycle, and (ii) caches write and read accesses to reduce memory access from said TS demux and said system bus, and
   wherein said RAM unit clocks at a speed higher than an interfacing data-path to increase an effective throughput of said RAM unit.

2. The memory chip of claim 1, wherein said RAM unit comprises multiple RAM sub units, wherein while a first RAM sub unit is clock gated, the remaining multiple RAM sub units are accessible.

3. The memory chip of claim 1, further comprising a register cache that is external to said RAM unit, wherein said register cache is adapted to decrease a frequency of read and write processes occurring with respect to said RAM unit.

4. The memory chip of claim 1, wherein said RAM unit is a single port RAM unit that is adapted to be clocked at approximately twice a system clock rate.

5. The memory chip of claim 4, wherein a first virtual port of said single port RAM unit is shared by a RS decoder read and write access.

6. The memory chip of claim 4, wherein a second virtual port of said single port RAM unit is shared by a post-processing system output read, control logic access, and a TS demux write access.

7. The memory chip of claim 1, wherein an amount of memory of said RAM unit is adapted to be extended by a fractional amount of a complete video frame.

8. The memory chip of claim 7, wherein the amount of extended fractional-frame memory is adapted to store a beginning portion of a second incoming video frame during which said RS decoder can complete a FEC process on a first video frame.

9. The memory chip of claim 8, wherein a remaining portion of said second incoming video frame overwrites a region wherein said first video frame was stored after said first video frame begins to be read out.

10. The memory chip of claim 1, further comprising a demodulator positioned on a same silicon chip as said RAM unit, said TS demux said RS decoder, and said system bus.

11. A Multi-Protocol Encapsulator Forward Error Connection (MPE-FEC) memory chip for use in a Digital Video Broadcasting over Handheld (DVB-H) receiver, said memory chip comprising:
   a Transport-stream packet de-multiplexer (TS demux);
   a Reed-Solomon (RS) decoder;
   a system bus;
   a random access memory (RAM) unit that simultaneously interfaces to said TS demux, said RS decoder, and said system bus through time-multiplexing; and
   a demodulator positioned on a same silicon chip as said RAM unit, said TS demux said RS decoder, and said system bus,
   wherein said RAM unit (i) accesses multiple-words per clock cycle, and (ii) caches write and read accesses to reduce memory access from said TS demux and said system bus, and
   wherein said RAM unit clocks at a speed higher than an interfacing data-path to increase an effective throughput of said RAM unit.

12. A method of processing video internet protocol (IP) datagrams in a Digital Video Broadcasting over Handheld (DVB-H) receiver, wherein said DVB-H receiver comprises a Multi-Protocol Encapsulator Forward Error Connection (MPE-FEC) memory chip comprising a Transport-stream (TS) packet de-multiplexer (TS demux); a Reed-Solomon (RS) decoder; a system bus; and a random access memory (RAM) unit that simultaneously interfaces to said TS demux, said RS decoder, and said system bus through time-multiplexing, said method comprising:
   configuring said RAM unit to access multiple-words per cycle and cache read and write accesses to said RAM unit to reduce memory access from said TS demux and said system bus; and
   clocking said RAM unit at a speed higher than an interfacing data-path to increase an effective throughput of said RAM unit.

13. The method of claim 12, further comprising splitting said RAM unit into multiple smaller RAM subunits.

14. The method of claim 12, further comprising using a register cache that is external to said RAM unit to decrease a frequency of read and write processes occurring with respect to said RAM unit.

15. The method of claim 12, further comprising clocking said RAM unit at approximately twice a system clock rate.

16. The method of claim 12, wherein an amount of memory of said RAM unit is adapted to be extended by a fractional amount of a complete video frame.

17. The method of claim 16, wherein the amount of extended fractional-frame memory is adapted to store a beginning portion of a second incoming video frame during which said RS decoder can complete a FEC process on a first video frame.

18. The method of claim 17, wherein a remaining portion of said second incoming video frame overwrites a region wherein said first video frame was stored after said first video frame begins to be read out.

19. The method of claim 12, further comprising positioning a demodulator on a same silicon chip as said RAM unit, said TS demux said RS decoder, and said system bus.

20. The method of claim 12, further comprising using a circular addressing scheme to allow the chip to receive back-to-back data bursts without doubling a size of said RAM unit.

* * * * *